United States Patent [19]

Takeda et al.

[11] Patent Number: 4,748,008

[45] Date of Patent: May 31, 1988

[54] PROCESS FOR SEPARATING URANIUM ISOTOPES BY OXIDATION-REDUCTION CHROMATOGRAPHY

[75] Inventors: Kunihiko Takeda, Yokohama; Heiichiro Obanawa, Kamakura, both of Japan

[73] Assignee: Asahi Kasei Kogyo Kabushiki Kaisha, Osaka, Japan

[21] Appl. No.: 816,056

[22] Filed: Jan. 3, 1986

[30] Foreign Application Priority Data

Jan. 9, 1985 [JP] Japan ........................... 60-895

[51] Int. Cl.⁴ ............... B01D 59/30; C01G 43/00; C22B 60/02
[52] U.S. Cl. ........................................ 423/6; 423/2; 423/7
[58] Field of Search .......................... 423/2, 6, 7

[56] References Cited

U.S. PATENT DOCUMENTS 4,112,045 9/1978 Seko et al. ........................ 423/7
4,202,860 5/1980 Miyake et al. ................... 423/6

FOREIGN PATENT DOCUMENTS 2150547 7/1985 United Kingdom ............ 423/6

*Primary Examiner*—John F. Terepane
*Assistant Examiner*—Virginia B. Caress
*Attorney, Agent, or Firm*—Birch, Stewart, Kolasch & Birch

[57] ABSTRACT

In a process for continuously separating uranium isotopes, $^{235}U$ and $^{238}U$, by oxidation-reduction chromatography using a column of an anion exchanger, the separation of uranium isotopes and the regeneration of the oxidizing agent and reducing agent both deactivated during the separation of uranium isotopes can be simultaneously effected in a single column by returning to and passing through the column of an anion exchanger having a uranium adsorption zone an eluate containing a deactivated oxidizing agent and a deactivated reducing agent to regenerate the deactivated oxidizing agent and the deactivated reducing agent and to form an oxidizing agent zone, and returning to and passing through the column the regenerated reducing agent for the reduction of uranium.

10 Claims, 1 Drawing Sheet

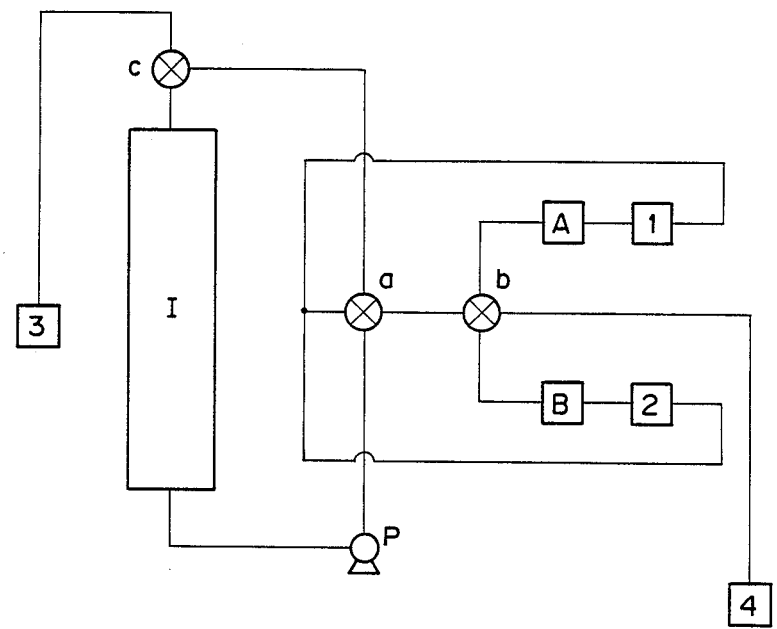

PROCESS FOR SEPARATING URANIUM ISOTOPES BY OXIDATION-REDUCTION CHROMATOGRAPHY

BACKGROUND OF THE INVENTION

1. Field of the Invention

This invention relates to a process for separating uranium isotopes by oxidation-reduced chromatography. More particularly, the present invention is concerned with a process for separating uranium isotopes by oxidation-reduction chromatography in which the separation of uranium isotopes and the regeneration of the oxidizing agent and reducing agent, both deactivated by the redox reaction during the separation of uranium isotopes, are simultaneously performed in a single column with great advantages.

2. Description of the Relevant Art

It is known that uranium isotopes can be separated by oxidation-reduction chromatography which comprises developing a uranium adsorption zone formed in a column of an anion exchanger while oxidizing the uranium adsorption zone at its front region and reducing the uranium adsorption zone at its rear region (see, for example, U.S. Pat. No. 4,112,045).

According to the method of U.S. Pat. No. 4,112,045, a solution containing an oxidizing agent which is capable of oxidizing uranium (IV) to uranium (VI) is supplied to a developing column packed with an anion exchanger to form an oxidizing agent adsorption zone. Then, a uranium isotope solution containing uranium (IV) is supplied to the column to convert a portion of the ozidizing agent adsorption zone to an adsorbed uranium (VI) zone. Thereafter, a solution containing a reducing agent which is capable of reducing uranium (VI) to uranium (IV) is supplied to the column to develop the adsorbed uranium (VI) zone while forming a reducing agent zone in rear of the adsorbed uranium (VI) zone, thereby causing the uranium (VI) adsorbed on the anion exchanger to be eluted in the form of uranium (IV). In the development of the adsorbed uranium (VI) zone, a boundary is formed between the oxidizing agent zone and the uranium (VI) zone, and a uranium solution recovered from the vicinity of this boundary has a high concentration of $^{238}U$. Also, another boundary is formed between the uranium (VI) zone and the reducing agent zone, and a uranium solution recovered from the vicinity of this boundary has a high concentration of $^{235}U$.

In the above-mentioned oxidation-reduction chromatography, a deactivated oxidizing agent and a deactivated reducing agent are eluted as a mixture thereof from the developing column. In this connection, there has been proposed a method for regenerating a deactivated oxidizing agent and a deactivated reducing agent contained in the eluate effluent from the developing column and for reusing them (see U.S. Pat. No. 4,202,860). According to the method, the eluate containing a deactivated oxidizing agent and a deactivated reducing agent is subjected to oxidization treatment to regenerate the deactivated oxidizing agent. The regenerated oxidizing agent is separated from the eluate using an anion exchanger. Then, the resulting eluate containing the deactivated reducing agent is subjected to reduction treatment to regenerate the deactivated reducing agent. The activated oxidizing agent and the activated reducing agent thus obtained are reused for further separation of uranium isotopes. In this method, the regeneration of the deactivaged oxidizing agent and the deactivated reducing agent are carried out outside the developing column by an oxidation-reduction reaction using oxygen and hydrogen, respectively, or by an electrolytic oxidation-reduction reaction.

The above-mentioned method disclosed in U.S. Pat. No. 4,202,860 is advantageous in that the regenerated oxidizing agent and the regenerated reducing agent can be used for further separation of uranium isotopes. However, the method has various disadvantages. Specifically, in the method, the separation of uranium isotopes in a single column (hereinafter after referred to as "single column separation method") is effected as follows. When a uranium adsorption zone has reached the bottom of a column packed with an anion exchanger, the separated uranium isotopes are fractionally collected, while a solution containing the deactivated oxidizing agent and the deactivated reducing agent which has been eluted and collected during the development of the uranium adsorption zone in the column is oxidized outside the column to regenerate the deactivated oxidizing agent. After completion of the collection of the separated uranium isotopes in fractions, the solution which has been subjected to oxidation treatment is supplied to the column. In the column, the regenerated oxidizing agent alone is adsorbed on the anion exchanger and the deactivated reducing agent is eluted. The eluted deactivated reducing agent is subjected to reduction treatment outside the column to regenerate the deactivated reducing agent. After completion of the adsorption of the regenerated oxidizing agent on the anion exchanger, the fractions of uranium isotopes are returned to the column to form a uranium adsorption zone. Subsequently, a solution containing the regenerated reducing agent is supplied to the column in order to further continue the development of the uranium adsorption zone. As is apparent from the foregoing, in the method of U.S. Pat. No. 4,202,860, the eluate containing the separated uranium isotopes effluent from the bottom of the column cannot be immediately returned to the column, but should be fractionally collected and separately reservoired prior to returning to the column until the adsorption of the regenerated oxidizing agent on the anion exchanger is completed. The fractional collection and separate reservation of the elute is not only troublesome but also results in partial mixing of the separated uranium isotopes, leading to a poor separation efficiency per unit time.

In order to eliminate the above-mentioned drawback accompanying the single column separation method in U.S. Pat. No. 4,202,860, there has been proposed a method of effecting the uranium isotope separation using two or more developing columns (hereinafter referred to as "multiple column separation method"). In the method, while the development of a uranium adsorption zone is performed in one developing column or two or more developing columns, an eluate containing the deactivated oxidizing agent and the deactivated reducing agent is subjected to oxidation treatment outside the column to regenerate the deactivated oxidizing agent. The treated eluate is supplied to at least one of the remaining developing columns where the development has not been effected, thereby forming an oxidizing agent zone while eluting the deactivated reducing agent. The deactivated reducing agent is subjected to reduction treatment outside the column to regenerate the deactivated reducing agent. The uranium adsorption zone which has been subjected to the separation of uranium isotopes in one developing column is transferred to the developing column where an oxidizing agent zone has been formed, thereby forming an uranium adsorption zone. Then, the regenerated reducing agent is supplied to the column in which the uranium adsorption zone has been formed. Thus, a uranium adsorption zone which has been developed in one column is immediately transferred to another developing column where an oxidizing agent zone has already been formed without the necessity of fractionally collecting and separately reservoiring the uranium eluate. However, the above-mentioned multiple column development method is disadvantageous in that the construction cost of two or more developing columns packed with an anion exchanger is high as compared with that of a single developing column and that the number of valves such as switchover valves to be used in the multiple column separation method is far larger than that to be used in the single column separation method, causing a danger of occurrence of valve trouble which leads to necessity of frequent shut-down of the operation due to the leakage of a liquid from the valves.

Further, in both the above-mentioned single column method and multiple column method, the whole of the deactivated oxidizing agent and the whole of the deactivated reducing agent are regenerated outside the column by means of oxygen and hydrogen, respectively, or by an electrolytic oxidization-reduction reaction. Therefore, these methods require a large amount of oxygen and hydrogen, or a large amount of electric power to regenerate the deactivated oxidizing agent and the deactivated reducing agent.

Therefore, both the above-mentioned methods, single column separation method and multiple column separation method, are disadvantageous from the commerical point of view.

SUMMARY OF THE INVENTION

In view of the current situation as described above, the present inventor has made extensive and intensive studies to separate uranium isotopes not only efficiently but also in a less costly fashion by oxidation-reduction chromatography. As a result, it has surprisingly been found that by passing a solution containing a deactivated oxidizing agent and a deactivated reducing agent through a column of an anion exchanger, both the deactivated oxidizing agent and the deactivated reducing agent can be regenerated in the column and that, by returning to and passing through a column of an anion exchanger having a uranium adsorption zone an eluate effluent from the bottom of the column and containing a deactivated oxidizing agent and a deactivated reducing agent, the separation of uranium isotopes and the regeneration of the deactivated oxidizing agent and the deactivated reducing agent can be simultaneously effected in a single column. The present invention has been made based on such novel findings.

Accordingly, it is an object of the present invention to provide a process for separating uranium isotopes by oxidation-reduction chromatography which enables the separation of uranium isotopes and the regeneration of a deactivated oxidizing agent and a deactivated reducing agent to be simultaneously effected in a single column.

DETAILED DESCRIPTION OF THE INVENTION

The foregoing and other objects, features and advantages of the present invention will be apparent to those skilled in the art from the following detailed description taken in conjunction with the accompanying drawing which illustrates the flow diagram of an apparatus of one embodiment of the present invention.

According to the present invention, there is provided a process for continuously separating uranium isotopes, $^{235}U$ and $^{238}U$, by passing a solution of a mixture of uranium isotopes in a solvent through a column of an anion exchanger, thereby forming in the column of a boundary (A) between a uranium adsorption zone and an adjacent reducing agent zone and a boundary (B) between the uranium adsorption zone and an adjacent oxidizing agent zone, advancing the uranium adsorption zone through the column while effecting reduction at the boundary (A) and effecting oxidation at the boundary (b), thereby to effect enrichment of $^{235}U$ and $^{238}U$ at said boundary (A) and said boundary (B), respectively, and separately collecting fractions enriched in said isotopes, respectively, which comprises returning to and passing through the column of an anion exchanger having the uranium adsorption zone an elute containing a deactivated oxidizing agent and a deactivated reducing agent to regenerate the deactivated oxidizing agent and the deactivated reducing agent and to form an oxidizing agent zone, and returning to and passing through the column the regenerated reducing agent for the reduction of uranium, thereby simultaneously effecting in a single column of an anion exchanger the separation of $^{235}U$ and $^{238}U$ and the regeneration of the deactivated oxidizing agent and the deactivated reducing agent.

For simplicity in the following explanation, an oxidizing agent, a reducing agent and uranium are often denoted by the symbols "O", "R" and "U", respectively, and a lower oxidation number and a higher oxidation number are denoted by the suffix "I" and suffix "II", respectively. For example, OI denotes an oxidizing agent in the deactivated state whose oxidation number is decreased, RI denotes a reducing agent in the active state with a lower oxidation number, and UI and UII denote uranium (IV) and uranium (VI), respectively.

In the present invention, uranium atoms should be in an anionic form. Uranium ions which are not coordinated with a ligand are usually in a cationic form. The uranium cation may be converted to a uranium anion by forming a complex compound with a negatively charged ligand as will be mentioned later. The term "uranium (IV)" and "UI", as used in the present invention is intended to mean all tetravalent uranium ions including complex ions, and the term "uranium (VI)" and "UII" as used in the present invention all hexavalent uranium ions including complex ions.

According to the process of the present invention, U(VI) ions are adsorbed on an anion exchanger more selectively than U(IV) ions and $^{235}U$ of U(VI) ions remain on the anion exchanger, and $^{235}U$ concentration increases as it comes closer to the boundary between the uranium adsorption zone and the reducing agent zone, and $^{238}U$ concentration increases as it comes closer to the boundary between the uranium adsorption zone and the oxidizing agent zone.

In the present invention, it is preferred that the adsorbability of OII on an anion exchanger to be used be higher than that of UII, UI and RII, that the adsorbability of UII on an anion exchanger be higher than that of UI and that the absorbability of RI, RII and OI on an anion exchanger be as low as possible.

The adsorbability of UI, UII, OI, OII, RI and RII on an anion exchanger may be controlled by varying the kind and concentration of a negatively charged ligand as will be mentioned later and the hydrogen ion concentration of the solution, and the like.

In the present invention, an eluate which has been eluted from the bottom of the column and containing a deactivated oxidizing agent and a deactivated reducing agent is returned to and passed through the column of an anion exchanger having a uranium adsorption zone to regenerate the deactivated oxidizing agent and the deactivated reducing agent and to form an oxidizing agent zone and, then, the regenerated reducing agent eluted from the bottom of the column is returned to and passed through the column for the reduction of uranium. In this connection, the anion exchanger may be one having one uranium adsorption zone and one oxidizing agent zone adjacent the uranium adsorption zone. Alternatively, the anion exchanger may be one having two or more uranium adsorption zones and an oxidizing agent zone adjacent each uranium adsorption zone.

In the case of forming one uranium adsorption zone and one oxidizing agent zone adjacent the uranium adsorption zone in a column of an anion exchanger, the method consists in:

(a-1) feeding to an anion exchanger column, having an oxidizing agent zone in which an oxidizing agent capable of oxidizing a uranium (IV) compound to a uranium (VI) compound is adsorbed on the anion exchanger, a uranium isotope solution containing a uranium (IV) compound or containing a uranium (IV) compound and a uranium (VI) compound to oxidize the uranium (IV) compound to a uranium (VI) compound and to form a uranium adsorption zone in rear of the oxidizing agent zone while simultaneously reducing the oxidizing agent present in the oxidizing agent zone to a deactivated oxidizing agent, thereby forming a front boundary between the oxidizing agent zone and the uranium adsorption zone and moving the front boundary while oxidizing the uranium (IV) compound to a uranium (VI) compound at the front boundary; and (a-2) feeding to the column a solution containing a reducing agent capable of reducing a uranium (VI) compound to a uranium (IV) compound to reduce the uranium (VI) compound present in the uranium adsorption zone to a uranium (IV) compound while forming a reducing agent zone in rear of the uranium adsorption zone and oxidizing the reducing agent to a deactivated reducing agent, thereby forming a rear boundary between the uranium adsorption zone and the reducing agent zone and moving the rear boundary while reducing the uranium (VI) compound to a uranium (IV) compound at the rear boundary, thereby to effect concentration of $^{238}U$ and $^{235}U$ at said front and rear boundaries, respectively; said deactivated reducing agent and said deactivated oxidizing agent being caused to be eluted in the form of a mixed solution thereof from the bottom of the column;

said eluted mixed solution being in the state of chemical equilibrium in which part of the deactivated oxidizing agent and part of the deactivated reducing agent are converted by an oxidation-reduction reaction into an activated oxidizing agent and an activated reducing agent, respectively, to attain the chemical equilibrium therebetween.

On the other hand, in the case of forming two or more uranium adsorption zones and an oxidizing agent zone adjacent each uranium adsorption zone, the method consists in:

(b-1) feeding to an anion exchanger column, having an oxidizing agent zone in which an oxidizing agent capable of oxidizing a uranium (IV) compound to a uranium (VI) compound is adsorbed on said anion exchanger, a uranium isotope solution containing a uranium (IV) compound or containing a uranium (IV) compound and a uranium (VI) compound to oxidize the uranium (IV) compound to a uranium (VI) compound and to form a uranium adsorption zone in rear of the oxidizing agent zone while simultaneously reducing the oxidizing agent present in the oxidizing agent zone to a deactivated oxidizing agent, thereby forming a front boundary between the oxidizing agent zone and the uranium adsorption zone and moving the front boundary while oxidizing the uranium (IV) compound to a uranium (VI) compound at the front boundary;

(b-2) feeding to the column a solution containing a reducing agent capable of reducing a uranium (VI) compound to a uranium (IV) compound to reduce the uranium (VI) compound present in the uranium adsorption zone to a uranium (IV) compound while forming a reducing agent zone in rear of the uranium adsorption zone and oxidizing the reducing agent to a deactivated reducing agent, thereby forming a rear boundary between the uranium adsorption zone and the reducing agent zone and moving the rear boundary while reducing the uranium (VI) compound to a uranium (IV) compound at the rear boundary;

(b-3) feeding to the column a solution containing an oxidizing agent capable of oxidizing a uranium (IV) compound to a uranium (VI) compound or a solution containing a deactivated oxidizing agent and a deactivated reducing agent to form another oxidizing agent zone in rear of the reducing agent zone;

(b-4) feeding to the column a uranium isotope solution containing a uranium (IV) compound or containing a uranium (IV) compound and a uranium (VI) compound to oxidize the uranium (IV) compound to a uranium (VI) compound and to form another uranium adsorption zone in rear of the another oxidizing agent zone and to form another front boundary between the another oxidizing agent zone and the another uranium adsorption zone; and (b-5) feeding to the column a solution containing a reducing agent capable of reducing a uranium (VI) compound to a uranium (IV) compound to form another reducing agent zone in rear of the another uranium adsorption zone and to form another rear boundary between the another uranium zone;

the steps (b-3) to (b-5) in this order being performed at least one time;

thereby forming two or more uranium adsorption zones in the column and effecting concentration of $^{238}U$ and $^{235}U$ at each front boundary and each rear boundary, respectively; the deactivated reducing agent produced in the step (b-2) and the deactivated oxidizing agent produced in the step (b-1) being caused to be eluted in the form of a mixed solution thereof from the bottom of the column;

the eluted mixed solution being in the state of chemical equilibrium in which part of the deactivated oxidizing agent and part of the deactivated reducing agent are converted by an oxidation-reduction reaction into a regenerated oxidizing agent and a regenerated reducing agent, respectively, to attain the chemical equilibrium therebetween.

The eluted mixed solution obtained in the above-mentioned step (a) or (b) and containing the deactivated oxidizing and reducing agents and the activated oxidizing and reducing agents in the state of chemical equilibrium is fed to the column to form as the rearmost zone a regenerating zone in which the activated oxidizing agent of the eluted mixed solution is adsorbed on the anion exchanger to upset the state of chemical equilibrium so that the oxidation-reduction reaction between part of the deactivated oxidizing agent and part of the deactivated reducing agent is caused to proceed with the formation of activated oxidizing and reducing agents until chemical equilibrium is attained therebetween, thereby effecting regeneration of the deactivated oxidizing and reducing agents while forming, in rear of the regenerating zone, an activated oxidizing agent zone in which the activated oxidizing agent is adsorbed on the anion exchanger, thereby to cause the activated reducing agent to pass down to the column. The activated reducing agent is returned to the column for the reduction of uranium.

As examples of the oxidizing agents which are preferably employed in the present invention, there may be mentioned Tl(III), Pb(IV), Sb(V), V(IV), Cr(VI), Mn(VII), Fe(III), Co(III) and Cu(II). Of them, Cr(VI), Mn(VII), Fe(III) and Cu(II) are more preferable.

As examples of the reducing agents which are preferably employed in the present invention, there may be mentioned In(I), Sn(II), Sb(III), Ti(III), V(III), V(II), Nb(IV) and Cu(I). Of them, Sn(II), Ti(III) and V(III) are more preferable.

In the process of the present invention, a solution of a mixture of uranium isotopes in a solvent is supplied to the column. In this connection, it is preferred that the separation of uranium isotopes be carried out in an acidic solution. The hydrogen ion concentration of the acidic solution may be in the range of from about $10^{-3}$ M to about 11 M, preferably from about $10^{-1}$ M to about 10 M. Typical examples of suitable acids are inorganic acids such as hydrochloric acid, hydrobromic acid, sulfuric acid and hydrofluoric acid, etc. The acidic solution may also contain an electron exchange catalyst as disclosed in U.S. Pat. No. 4,049,769.

As examples of the solvent, there may be mentioned water, an organic solvent such as methanol, ethanol, dioxane, acetone and ethylene glycol, a mixture of water and the organic solvent, and the like.

The concentration of uranium ions in the solution may be in the range of from about $10^{-3}$ M to about 4 M, preferably from about $10^{-2}$ M to about 2 M. The concentration of the negatively charged ligands may be in the range of from about $10^{-3}$ M to about 12 M, preferably from about $10^{-1}$ M to about 10 M. Examples of the ligands which can be used include inorganic ions, e.g. $F^-$, $Cl^-$, $Br^-$, $NO_3^-$, $CN^-$, $SO_4^{2-}$, etc; and inorganic ions, e.g. ions of monocarboxylic acids such as acetic acid, monochloroacetic acid, dichloroacetic acid, etc., ions of dicarboxylic acids such as oxalic acid, malonic acid, maleic acid, phthalic acid, etc., ions of hydroxy acids such as glycolic acid, $\beta$-hydroxypropionic acid, citric acid, lactic acid, hydroxysuccinic acid, tartaric acid, sulfosalicylic acid, etc. ions of amino acids such as glycine, alanine, $\beta$-alanine, aspartic acid, glutamic acid, etc., and ions of aminopolycarboxylic acids such as nitrilotriacetic acid, ethylenediamine tetraacetic acid, 1,2-cyclohexanediamine tetraacetic acid, etc. The above-mentioned ligands may be added to the solution of a mixture of uranium isotopes in the form of an acid or a salt which is soluble in the solvent.

The temperature which may be employed in the separation of uranium isotopes according to the present invention may be in the range of from about 10° C. to about 250° C., preferably from about 30° C. to about 200° C.

In practicing the process of the present invention, the pressure is not critical, and may be varied from the atmospheric pressure to about 120 kg/cm². In general, the separation is carried out above the atmospheric pressure at a temperature below the boiling point of the solvent employed in the solution. Alternatively, when the temperature is higher than the boiling point of the solvent employed, the separation is carried out under a pressure above the atmospheric pressure sufficient to prevent the solvent from boiling. The linear velocity of the boundary between the uranium adsorption zone and the adjacent reducing agent zone and the linear velocity of the boundary between the uranium adsorption zone and the adjacent oxidizing agent zone may be in the range of from about 5 cm per day to about 1000 m per day, preferably from about 1 m to about 500 m per day.

Any anion exchangers which adsorb uranium (VI) thereon but do not adsorb uranium (IV) thereon may be used in the present invention.

As examples of the anion exchangers, there may be mentioned, for example, chloromethylated and aminated products of a crosslinked high molecular weight polymer prepared by addition copolymerization of styrene, methylstyrene, ethylstyrene and the like with divinylbenzene as the main components; aminated products of a crosslinked polymer prepared by addition copolymerization of, as the main components, a monomer having an active group such as chloromethylstyrene, methylethyl ketone, epoxybutadiene or acrylamide with a crosslinking monomer such as divinylbenzene or triallyl isocyanurate; cross-linked polymers prepared by polymerization of a monomer having a nitrogen capable of forming an exchange group such as N-vinylsuccinimide, N-vinylphthalimide, vinylcarbazole, vinylimidazole, vinylpyridine, vinyltetrazole, vinylquinoline, divinylpyridine and the like as the main component or by copolymerization of such a monomer having a nitrogen capable of forming an exchange group with a cross-linking monomer, if desired, or reaction products with such a monomer having a nitrogen capable of forming an exchange group; a cross-linked polycondensate prepared by condensation of an amine such as polyethyleneimine or hexamethylenediamine with a polyfunctional compound; and those in which an ion exchangeable liquid such as tributyl phosphate or trioctylamine is supported on the solid surface of silica gel or a zeolite.

Ion exchangers which are preferably employed in the process of the present invention are strongly basic anion exchangers having quaternary ammonium groups therein prepared by chloromethylating styrenedivinylbenzene copolymers, followed by amination, or weakly basic anion exchangers having primary or tertiary amino groups therein.

As amines to be used in amination for the preparation of anion exchangers as mentioned above, there may be mentioned, for example, aliphatic amines such as triethanolamine, triethylamine, trimethylamine, triallylamine, diethanolamine, diallylamine, diethylamine, dimethylamine, 2-aminoethanol, ethylamine, methylamine, ethanolamine and the like; aromatic amines such as aniline, o-aminophenol, N,N-dimethylaniline, N-methylaniline, m-toluidine, p-toluidine, p-aminophenol, diphenylamine and the like; heterocyclic amines such as pyridine, γ-picoline, piperidine, pyrazine, piperazine, indoline, indole, imidazole, 2-methylimdazole, quinoline, 2,6-lutidine, 1,2,3,4-tetrahydroquinoline, N-methylpyrrolidine, benzotriazole and the like.

To provide a better understanding of the present invention, reference will now be made to a preferred embodiment thereof in connection with the flow diagram shown in the drawing. However, the process of the present invention is not limited to the embodiment as will be mentioned below. It will be obvious that the method may be varied in many ways. Such variations are not be be regarded as a departure from the spirit and scope of the present invention, and all such modifications as would be obvious to one skilled in the art are intended to be included within the scope of the present invention.

In the embodiment illustrated in the drawing which is a basic recycling system according to the process of the present invention, I denotes a column packed with an anion exchanger; P a feed pump; a, b and c switchover valves; 1 a reservoir for a reducing agent solution; 2 a reservoir for a mixed solution containing a deactivated oxidizing agent and a deactivated reducing agent; 3 a reservoir for a uranium solution; 4 a reservoir for separated uranium isotopes; A a supplementary reducing apparatus; and B a supplementary oxidizing apparatus.

The supplementary reducing apparatus A is optionally employed to regenerate a small amount of the deactivated reducing agent present in an eluate containing the regenerated reducing agent. An exemplary supplementary reducing apparatus comprises a jacketed autoclave type column packed with a reducing catalyst supported on a carrier, and a liquid-gas separator connected to the column. In order to effect the reduction of a small amount of the deactivated reducing agent present in the eluate containing the regenerated reducing agent, the eluate is supplied to the column from its bottom together with hydrogen gas so that the eluate is contacted with the hydrogen gas.

On the other hand, the supplementary oxidizing apparatus B is optionally employed for oxidizing a small amount of the reducing agent present in an eluate containing the deactivated oxidizing agent and the deactivated reducing agent. An exemplary supplementary oxidizing apparatus comprises a jacketed autoclave type column packed with glass Raschig rings and a liquid-gas separator connected to the column. In order to effect the oxidation of a small amount of the reducing agent present in the eluate containing the deactivated oxidizing agent and the deactivated reducing agent, the eluate is supplied to the column from its bottom together with oxygen gas so that the eluate is contacted with the oxygen gas.

In the process of the present invention, it is preferred that the above-mentioned supplementary oxidizing apparatus and supplementary reducing apparatus be employed in order to continuously conduct the separation of uranium isotopes stably.

In the present invention, it is preferred that a preliminary test which will be mentioned below be effected prior to effecting the separation of uranium isotopes.

In the preliminary test, a mixed solution containing OI and RII is first supplied to the column I packed with an anion exchanger through a route 2a-c. In the column I, the oxidation-reduction reaction as mentioned before proceeds between OI and RII to regenerate OII and RI. The regenerated OII is adsorbed on the anion exchanger, while the regenerated RI is eluted from the bottom of the column. In this connection, the eluate effluent from the bottom of the column is fractionally collected and the fractions are separately subjected to analyses to determine the concentrations of RI, RII, OI and OII in each fraction and the redox potential of each fraction.

The relationship between the volume amount of the mixed solution fed to the column I and the RI concentration of each fraction is then examined. From the above relationship, determination is made of the volume amount of the mixed solution fed to the column I until the RI concentration of the eluate effluent from the bottom of the column I has become lower than that of the RI solution in the reservoir 1. The thus determined volume amount of the mixed solution is hereinafter referred to as "Vf".

Next, the relationship between the volume amount of the mixed solution fed to the column and the concentrations of RII and OI in each fraction is examined. From the above relationship, determined is the volume amount of the mixed solution fed to the column until the concentrations of RII and OI of the eluate effluent from the bottom of the column I has become the same as those of the mixed solution in the reservoir 2. The thus determined volume amount of the mixed solution is hereinafter referred to as "Vr".

Then, mixed are the fractions collected in a period between when the concentration of RI in the eluate has become lower than that of the RI solution in the reservoir 1 and when the concentrations of RII and OI in the eluate has become the same as those of the mixed solution in the reservoir 2. The redox potential of the resulting mixture, i.g. an average redox potential, is determined. At the same time, the relationship between the redox potential of each fraction and the volume amount of the mixed solution fed to the column are determined. From the above relationship, determined is the volume amount of the mixed solution fed to the column until the redox potential of the eluate effluent from the bottom of the column is the same as the average redox potential. The thus determined volume amount of the mixed solution is hereinafter referred to as "Va".

Subsequently, a uranium solution containing UI or a uranium solution containing UI and UII is supplied to the column through a route 3-c-I to form a UII adsorption zone. Determined is the volume amount of the uranium solution fed to the column I until the forward end of the UII adsorption zone has reached the bottom of the column. The thus determined volume amount of the uranium solution is hereinafter referred to as "Vu".

A representative method of separating uranium isotopes while recycling one uranium adsorption zone through the column and regenerating RII and OI in the column will now be explained below.

First, (Vr−Vu) or more volume of a mixed solution containing OI and RII is supplied to the column I through a route 2-a-c-I to regenerate OI and RII and to form an OII zone in the column I. The volume amount of the mixed solution fed to the column I is hereinafter referred to as "V1".

Then, (Vf−V1) or less volume of a uranium solution containing UI or a solution containing UI and UII is supplied to the column I through a route 3-c-I to oxidize UI to UII and to form a UII zone in rear of the OII zone while simultaneously reducing OII present in the OII zone to OI. The volume amount of the uranium solution fed to the column is hereinafter referred to as "V2".

Subsequently, [Vf−(V1+V2)] volume of a solution containing RI is supplied to the column I through a route 1-a-c-I to develop the UII adsorption zone and to form a RI zone in rear of the UII adsorption zone. Then, an eluate from the bottom of the column containing the regenerated RI is fed to the column I through a route I-P-a-b-A-1-a-c-I to continue the development of the UII adsorption zone. In the development of the UII adsorption zone, $^{238}U$ is concentrated at the boundary between the OII zone and the UII adsorption zone while $^{235}U$ is concentrated at the boundary between the UII adsorption zone and the RI zone.

When the volume amount of the eluate fed to the column I through the route I-P-a-b-A-1-a-c-I has reached (Va−Vf) volume, the flow route of the eluate is switched over to a route I-P-a-b-B-2-a-c-I. At this time, a regenerating zone in which RII and OI is regenerated is formed in rear of the RI zone while forming an OII zone in rear of the regenerating zone.

When the forward end of the OII adsorption zone has reached the bottom of the column, the flow route of the eluate is switched over to a route I-P-a-c-I to form a UII adsorption zone in rear of the OII adsorption zone.

When the entire UI eluate has been returned to the column I at its top, the resulting eluate containing the regenerated RI is returned to the column I through a route I-P-a-b-A-1-a-c-I to develop the UII adsorption zone and to form a RI zone in rear of the UII zone.

When the volume amount of the eluate fed to the column I has reached [Va−(V1+V2)] volume, the flow route of the eluate is switched over to a route I-P-a-b-B-2-a-c-I to form a regenerating zone in rear of the RI zone while simultaneously forming an OII zone in rear of the regenerating zone.

When the forward end of the UII adsorption zone has reached the bottom of the column, the flow route of the eluate is switched over to a route I-P-a-c-I to supply the resulting UI eluate to the column I and to form a UII adsorption zone in rear of the OII zone. Thus, the UII adsorption zone is recycled through the column I while regenerating RII and OI in the column until the intended separation of $^{235}U$ and $^{238}U$ is attained.

Next, a representative method of separating uranium isotopes while recycling a plurality of uranium adsorption zones through the column and regenerating RII and OI in the column will be explained below. According to this method, the separation of uranium isotopes can be effectively and efficiently performed with extremely high productivity. The number of uranium adsorption zones to be formed in the column is hereinafter referred to as "n".

First, (Vr−Vu) or more volume of a mixed solution containing OI and RII is supplied to the column I through a route 2-a-c-I to regenerate OI and RII and to form an OII zone in the column I. The volume amount of the mixed solution fed to the column I is hereinafter referred to as "V1'".

Then, [(Vf/n)−V1'] or less volume of a uranium solution containing UI or a solution containing UI and UII is supplied to the column I through a route 3-c-I to oxidize UI to UII and to form a UII adsorption zone in rear of the OII zone while simultaneously reducing OII present in the OII zone to OI. The volume amount of the uranium solution fed to the column is hereinafter referred to as "V2'".

Subsequently, [(Vf/n)−(V1'+V2')] volume of a solution containing RI is supplied to the column I through a route 1-a-c-I to develop the UII adsorption zone and to form a RI zone in rear of the UII adsorption zone. Further, [(Va−Vf)/n] volume of a solution containing RI is additionally supplied to the column I through the route 1-a-c-I to continue the development of the UII adsorption zone.

Then, (Vr−Vu) or more volume of a mixed solution containing OI and RII is supplied to the column I through a route 2-a-c-I to regenerate OI and RII and to form another OII zone in the column I. The volume of the mixed solution fed to the column I is hereinafter referred to as "V1''".

Then, [(Vf/n)−V1''] or less volume of a uranium solution containing UI or a solution containing UI and UII is supplied to the column I through a route 3-c-I to oxidize UI to UII and to form another UII adsorption zone in rear of the another OII zone while simultaneously reducing OII present in the another OII zone to OI. The volume amount of the uranium solution fed to the column is hereinafter referred to as "V2''".

Subsequently, [(Vf/n)−(V1''+V2'')] volume of a solution containing RI is supplied to the column I through a route 1-a-c-I to develop the another UII adsorption zone and to form another RI zone in rear of the another UII adsorption zone.

The above-mentioned procedures are repeated to form the intended number of uranium adsorption zones in the column I.

Then, the resulting eluate containing a regenerated RI is supplied to the column I through a route I-P-a-b-A-1-a-c-I to develop the rearmost UII adsorption zone.

When the volume amount of the eluate containing R1 fed to the column I has reached [(Va−Vf)/n] volume, the flow route of the eluate is switched over to a route I-P-a-b-B-2-a-c-I. At this time, a regenerating zone in which RII and OI is regenerated is formed in rear of the rearmost RI zone while forming an IOO zone in rear of the regenerating zone.

When the forward end of the UII adsorption zone has reached the bottom of the column, the flow rate of the eluate is switched over to a route I-P-a-c-I to supply the resulting UI eluate to the column I and to form a UII adsorption zone in rear of the OII adsorption zone.

When the entire UI eluate has been returned to the column I at its top, the resulting eluate containing the regenerated RI is returned to the column I through a route I-P-a-b-A-1-a-c-I to develop the UII adsorption zone and to form a RI zone in rear of the UII adsorption zone.

When the volume amount of the eluate fed to the column I has reached [(Va/n)−(V1'+V2')] volume, the flow route of the eluate is switched over to a route I-P-a-b-B-2-a-c-I to form a regenerating zone in rear of the RI zone while simultaneously forming an OII zone in rear of the regenerating zone.

When the forward end of the UII adsorption zone has reached the bottom of the column, the flow route of the eluate is switched over to a route I-P-a-c-I to supply the resulting UI eluate to the column I and to form a UII adsorption zone in rear of the OII zone. Thus, a plurality of UII adsorption zones are recycled through the column I while regenerating RII and OI in the column until the intended separation of $^{235}U$ and $^{238}U$ is attained.

As described before, according to the present invention, a continuous separation of uranium isotopes, $^{235}U$ and $^{238}U$, and the regeneration of the reducing agent and oxidizing agent both deactivated during the separation of uranium isotopes can be simultaneously effected in a single column. Therefore, the process of the present invention is very advantageous in that not only the construction cost of the apparatus to be used is low, but also the danger of occurrence of valve trouble which leads to necessity of frequent shut-down of the separation operation due to the leakage of a liquid from valves such as switchover valves is less caused as compared with that of the conventional multiple column separation method and that the amount of oxygen and hydrogen or the amount of an electric power to be used can be extremely reduced as compared with the conventional method in which the whole of the deactivated oxidizing agent and the whole of the deactivated reducing agent are regenerated outside the column by means of oxygen and hydrogen, respectively, or by an electrolytic oxidation-reduction reaction.

The present invention will now be illustrated in more detail by the following Examples that should not be construed as limiting the scope of the invention.

EXAMPLE 1

The enrichment of $^{235}U$ was effected using an apparatus shown in the accompanying drawing. There was employed a column I having a diameter of 20 mm and a length of 1,000 mm and equipped with a pyrex glass jacket. The column I was packed with an anion exchange resin up to a height of 900 mm. The anion exchanger resin used was a strongly basic anion resin having an exchange capacity of 4.3 milliequivalent/g, which was produced by aminating with trimethylamine a chloromethylated product of a crosslinked polymer synthesized by addition polymerization of styrene as a non-crosslinking polymerizable monomer and divinylbenzene as a crosslinking monomer. Four-way switchover valves a, b and c are electrically operatable and are connected to the column I, supplementary oxidizing apparatus A and supplementary reducing apparatus B as shown in the drawing.

The supplementary reducing apparatus A was comprised of a jacketed, pressure resistant column having a diameter of 20 mm and a length of 500 mm, a platinum catalyst packed therein in four stages and a gas-liquid separator having a volume of 300 ml and connected to the column.

The platinum catalyst employed was prepared by supporting 2% by weight of platinum on spherical carbon particles having a diameter of 3 mm as a carrier.

The supplementary oxidizing apparatus B was comprised of a jacketed, pressure resistant column having a diameter of 20 mm and a length of 500 mm, glass Raschig rings packed therein in four stages and a gas-liquid separator having a volume of 300 ml and connected to the column.

1000 ml of a solution containing 0.5 M of Ti(III) and 3.5 M of HCl was charged in a reservoir 1. 500 ml of a mixed solution containing 1.0 M of Fe(II), 0.5 M of Ti(IV) and 3.1 M of HCl was charged in a reservoir 2 and 500 ml of a solution containing 0.25 M of U(IV) and 3.5 M of HCl was charged in a reservoir 3.

First, a preliminary test was conducted to measure Vf, Vr, Va and Vu in the same manner as mentioned before. As a result, it was found that Vf was 205 ml, Vr 520 ml, Va 330 ml and Vu 420 ml.

Then, 120 ml of the mixed solution containing 1.0 M of Fe(II), 0.5 M of Ti(IV) and 3.1 M of HCl was supplied to the developing column I through a route 2-a-c-I to convert Fe(II) and Ti(IV) to Fe(III) and TI(III), respectively, and to form a Fe(III) adsorption zone in the column I.

Subsequently, 70 ml of the solution containing 0.25 M of U(IV) and 3.5 M of HCl was supplied to the column I through a route 3-c-I to form a uranium adsorption zone in rear of the oxidizing agent zone. Thus, a front boundary was formed between the uranium adsorption zone and the oxidizing agent zone.

Then, 15 ml of the solution containing 0.5 M of Ti(III) and 3.5 M of HCl was supplied to the column through a route 1-a-c-I to contact the adsorbed U(VI) and the elute it in the form of U(IV), thereby forming a reducing agent zone in the uranium adsorption zone and moving the uranium adsorption zone. Thus, a rear boundary was formed between the uranium adsorption zone and the reducing agent zone. Further, 125 ml of the resulting eluate containing Ti(III) was supplied to the column I through a route I-P-a-b-A-1-a-c-I while reducing Ti(IV) contained in the eluate using the supplementary reducing apparatus A.

Then, the flow route was switched over to a route I-P-a-b-B-2-a-c-I to feed the resulting eluate containing Fe(II) and Ti(IV) to the column I while oxidizing Ti(III) contained in the eluate using the supplementary oxidizing apparatus B.

When the forward end of the uranium adsorption zone had reached the bottom of the column I, the flow route was switched over to a route I-P-a-c-I to return the uranium adsorption zone to the column I at its top.

After the rear end of the uranium adsorption zone had been returned to the column I at its top, the flow route was switched over to a route I-P-a-b-A-1-a-c-I to develop the uranium adsorption zone.

When the amount of the eluate containing Ti(III) fed to the column had reached 140 ml, the flow rate of the eluate was switched over to a route I-P-a-b-B-2-a-c-I.

When the forward end of the uranium adsorption zone has reached the bottom of the column I, the flow route of the eluate was switched over to I-P-a-c-I to return the uranium adsorption zone to the column I at its top.

The above-mentioned operation was repeated to recycle the uranium adsorption zone ten times through the column I while regenerating the deactivated oxidizing agent [Fe(II)] and the deactivated reducing agent [TI(IV)] in the column I.

Thereafter, the resulting uranium eluate was fractionary collected through a route I-P-a-b-4 to provide samples for the measurement of the isotope ratio.

Incidentally, the flow rate of the solution through the entire system was 22 cc/min and the temperature of the system was maintained at 120° C.

The isotope ratio ($^{235}U/^{238}U$) of naturally occurring uranium used in this example was 0.00725. The isotope ratio of uranium ($^{235}U/^{238}U$) in the fraction closest to the rear boundary between the uranium adsorption zone and the reducing agent zone was measured with an electron bombardment type mass spectrometer and found to be 0.00761.

EXAMPLE 2

Using the same apparatus as in Example 1, 1000 ml of a solution containing 0.6 M of V (III) and 3.5 M of HCl was charged in the reservoir 1. 500 ml of a mixed solution containing 1.2 M of Fe(II), 0.6 M of V(IV) and 3.5 M of HCl was charged in the reservoir 2 and 500 ml of a solution containing 0.1 M of U(IV) and 3.5 M of HCl was charged in the reservoir 3.

First, a preliminary test was conducted in the same manner as in Example 1 to measure Vf, Vr, Va and Vu. As a result, it was found that Vf was 220 ml, Vr 450 ml, Va 330 ml and Vu 400 ml.

Then, 80 ml of the mixed solution containing 1.2 M of Fe(II), 0.6 M of V(IV) and 3.5 M of HCl was supplied to the developing column I through a route 2-a-c-I to convert Fe(II) and V(IV) to Fe(III) and V(III), respectively, and to form a Fe(III) adsorption zone in the column I.

Subsequently, 120 ml of the solution containing 0.1 M of U(IV) and 3.5 M of HCl was supplied to the column through a route 3-c-I to form a uranium adsorption zone in rear of the oxidizing agent zone. Thus, a front boundary was formed between the uranium adsorption zone and the oxidizing agent zone.

Then, 20 ml of the solution containing 0.6 M of V(III) and 3.5 M of HCl was supplied to the column through a route I-a-c-I to contact the adsorbed U(VI) and to elute it in the form of U(IV), thereby forming a reducing agent zone in the uranium adsorption zone and moving the uranium adsorption zone. Thus, a rear boundary was formed between the uranium adsorption zone and the reducing agent zone. Further, 110 ml of the resulting eluate containing V (III) was supplied to the column I through a route 1-P-a-b-A-1-a-c-I while reducing V (IV) contained in the eluate using the supplementary reducing apparaters A.

Then, the flow route was switched over to a route I-P-a-b-B-2-a-c-I to feed the resulting eluate containing Fe(II) and V(IV) to the column I while oxidizing V(III) contained in the eluate using the supplementary oxidizing apparatus B.

When the forward end of the uranium adsorption zone had reached the bottom of the column I, the flow route was switched over to a route I-P-a-c-I to return the uranium adsorption zone to the column I at its top.

After the rear end of the uranium adsorption zone had been returned to the column I at its top, the flow route was switched over to a route I-P-a-b-A-1-a-c-I to develop the uranium adsorption zone.

When the amount of the eluate containing V(III) fed to the column had reached 130 ml, the flow route of the eluate was switched over to a route I-P-a-b-B-2-a-c-I.

When the forward end of the uranium adsorption zone has reached the bottom of the column I, the flow route of the eluate was switched over to I-P-a-c-I to return the uranium adsorption zone to the column I at its top.

The above-mentioned operation was repeated to recycle the uranium adsorption zone twenty times through the column I while regenerating the deactivated oxidizing agent [Fe(II)] and the deactivated reducing agent [V(IV)] in the column I.

Thereafter, the resulting uranium eluate was fractionally collected through a route I-P-a-b-4 to provide samples for the measurement of the isotope ratio.

Incidentally, the flow rate of the solution through the entire system was 35 cc/min and the temperature of the system was maintained at 140° C.

The isotope ratio ($^{235}U/^{238}U$) of naturally occurring uranium used in this example was 0.00725. The isotope ratio of uranium ($^{235}U/^{238}U$) in the fraction closest to the rear boundary between the uranium adsorption zone and the reducing agent zone was measured with an electron bombardment type mass spectrometer and found to be 0.00802.

EXAMPLE 3

Using the same apparatus as in Example 1, 1000 ml of a solution containing 0.8 M of V(III) and 4.0 M of HCl was charged in the reservoir 1. 500 ml of a mixed solution containing 1.5 M of Fe(II), 0.8 M of V(IV) and 4.0 M of HCl was charged in the reservoir 2 and 500 ml of a solution containing 0.12 M of U(IV) and 4.0 M of HCl was charged in the reservoir 3.

First, a preliminary test was conducted in the same manner as in Example 1 to measure Vf, Vr, Va and Vu. As a result, in was found that Vf was 260 ml, Vr 420 ml, Va 320 ml and Vu 400 ml.

Then, 40 ml of the mixed solution containing 1.5 M of Fe(II), 0.8 M of V(IV) and 4.0 M of HCl was supplied to the developing column I through a route 2-a-c-I to convert Fe(II) and V(IV) to Fe(III) and V(III), respectively, and to form a Fe(III) zone (oxidizing agent zone) in the column I.

Subsequently, 80 ml of the solution containing 0.12 M of U(IV) and 4.0 M of HCl was supplied to the column I through a route 3-c-I to form a uranium adsorption zone in rear of the oxidizing agent zone. Thus, a front boundary was formed between the uranium adsorption zone and the oxidizing agent zone.

Then, 40 ml of the solution containing 0.8 M of V(III) and 4.0 M of HCl was supplied to the column I through a route 1-a-c-I to contact the adsorbed U(VI) and to elute it in the form of U(IV), thereby forming a reducing agent zone in the uranium adsorption zone and moving the uranium adsorption zone. Thus, a rear boundary was formed between the uranium adsorption zone and the reducing agent.

Subsequently, 40 ml of the mixed solution containing 1.5 M of Fe(II), 0.8 M of V(IV) and 4.0 M of HCl was supplied to the column I through a route 2-a-c-I to convert Fe(II) and V(IV) to Fe(III) and V(III), respectively, and to form another Fe(III) zone (oxidizing agent zone) in the column I.

Thereafter, the flow route was switched over to a route 3-c-I to form another uranium adsorption zone in rear of the another Fe(III) zone.

When the amount of the uranium solution fed had reached 80 ml, the flow route was switched over to 1-a-c-I to develop the another uranium adsorption zone.

When the amount of the reducing agent fed to the column had reached 10 ml, the flow route was switched over to a route I-P-a-b-A-1-a-c-I to supply 30 ml of the resulting eluate containing V(III) to the column I.

Then the flow route was switched over to a route I-P-a-b-B-2-c-I to form a Fe(III) zone.

When the forward end of the uranium adsorption zone has reached the bottom of the column I, the flow route of the eluate was switched over to I-P-a-c-I to return the uranium adsorption zone to the column I at its top.

After the rear end of the uranium adsorption zone had been returned to the column I at its top, the flow route was switched over to a route I-P-a-b-A-1-a-c-I to develop the uranium adsorption zone.

When the amount of the eluate containing V(III) fed to the column had reached 40 ml, the flow route of the eluate was switched over to a route I-P-a-b-B-2-a-c-I.

When the forward end of the uranium adsorption zone had reached the bottom of the column I, the flow route of the eluate was switched over to I-p-a-c-I to return the uranium adsorption zone to the column I at its top.

After the rear end of the uranium adsorption zone has been returned to the column I at its top, the flow route was switched over to a route I-P-a-b-A-1-a-c-I to develop the uranium adsorption zone.

When the amount of the eluate containing V(III) fed to the column had reached 40 ml, the flow route of the eluate was switched over to a route I-P-a-b-B-2-a-c-I.

The above-mentioned operation was repeated to recycle each uranium adsorption zone ten times through the column I while regenerating the deactivated oxidizing agent [Fe(II)] and the deactivated reducing agent [V(IV)] in the column I.

Thereafter, the resulting uranium eluate was fractionally collected through a route I-P-a-b-4 to provide samples for the measurement of the isotope ratio.

Incidentally, the flow rate of the solution through the entire system was 25 cc/min and the temperature of the system was maintained at 140° C.

The isotope ratio ($^{235}U/^{238}U$) of naturally occurring uranium used in this example was 0.00725. The isotope ratios of uranium ($^{235}U/^{238}U$) in the fractions closest to the rear boundaries between the uranium adsorption zones and the reducing agent zones were measured with an electron bombardment type mass spectrometer and found to be 0.00793 and 0.00791, respectively.

What is claimed is:

1. In a process for continuously separating uranium isotopes, $^{235}U$ and $^{238}U$, by passing an acidic solution of a mixture of uranium isotopes in a solvent through a column of an anion exchanger, thereby forming in said column a boundary (A) between a uranium adsorption zone and an adjacent reducing agent zone and a boundary (B) between said uranium adsorption zone and an adjacent oxidizing agent zone; advancing said uranium adsorption zone through said column while effecting reduction at said boundary (A) and effecting oxidation at said boundary (B), thereby to effect enrichment of $^{235}U$ and $^{238}U$ at said boundary (A) and said boundary (B), respectively; and separately collecting fractions enriched in said isotopes, respectively, the improvement which comprises:

returning to and passing through said column having said uranium adsorption zone an eluate, said eluate containing a deactivated oxidizing agent and a deactivated reducing agent, so as to regenerate said deactivated oxidizing agent and said deactivated reducing agent and so as to form an oxidizing agent zone; and returning to and passing through said column said regenerated reducing agent for the reduction of uranium, thereby simultaneously effecting in a single column of an anion exchanger the separation of $^{235}U$ and $^{238}U$ and the regeneration of the deactivated oxidizing agent and deactivated reducing agent.

2. A process according to claim 1, wherein said anion exchanger has one uranium adsorption zone and one oxidizing agent zone adjacent to said uranium adsorption zone.

3. A process according to claim 1, wherein said anion exchanger has two or more uranium adsorption zones and an oxidizing agent zone adjacent to each of said uranium adsorption zones.

4. A process according to claim 1, wherein said oxidizing agent is at least one member selected from the group consisting of Tl(III), Pb(IV), Sb(V), V(IV), Cr(VI), Mn(VII), Fe(III), Co(III), and Cu(II).

5. A process according to claim 1, wherein said reducing agent is at least one member selected from the group consisting of In(I), Sn(II), Sb(III), Ti(III), V(III), V(II), Nb(IV) and Cu(I).

6. A process according to claim 1, wherein said acidic solution of a mixture of uranium isotopes has a hydrogen ion concentration of $10^{-3}$ M to 11 M.

7. A process according to claim 6, wherein said hydrogen ion concentration is $10^{-1}$ M to 10 M.

8. A process according to claim 6, wherein said uranium isotope separation is carried out at a temperature of 10° C. to 250° C.

9. A process according to claim 8, wherein said oxidizing agent is at least one member selected from the group consisting of Cr(VI), Mn(VII), Fe(III) and Cu(II), and said reducing agent is at least one member selected from the group consisting of Sn(II), Ti(III) and V(III).

10. A process according to claim 8, wherein said uranium isotope separation is carried out at a temperature of 30° C. to about 200° C.

* * * * *